(12) United States Patent
Clark

(10) Patent No.: US 8,043,033 B2
(45) Date of Patent: Oct. 25, 2011

(54) LASER-GUIDED COORDINATION HOLE DRILLING

(75) Inventor: Gregory L. Clark, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 492 days.

(21) Appl. No.: 12/112,845

(22) Filed: Apr. 30, 2008

(65) Prior Publication Data

US 2009/0022556 A1    Jan. 22, 2009

Related U.S. Application Data

(62) Division of application No. 10/752,285, filed on Jan. 6, 2004, now Pat. No. 7,384,220.

(51) Int. Cl.
*B23B 47/00* (2006.01)

(52) U.S. Cl. .............. 408/1 R; 408/13; 408/75; 408/76; 408/97; 409/178

(58) Field of Classification Search ............ 408/4, 8–13, 408/75, 76, 88, 95, 97, 234; 409/175, 178
See application file for complete search history.

(56) References Cited

U.S. PATENT DOCUMENTS

| | | | |
|---|---|---|---|
| 2,211,216 A | 8/1940 | Oster | |
| 2,378,659 A | 6/1945 | Ross | |
| 2,716,555 A | 8/1955 | Rowe | |
| 2,838,966 A | 6/1958 | Campbell | |
| 2,911,860 A | 11/1959 | Winslow et al. | |
| 3,596,558 A | 8/1971 | Rydell | |
| 3,663,115 A | 5/1972 | Vindez et al. | |
| 3,872,951 A | 3/1975 | Hastings, Jr. | |
| 4,131,837 A | 12/1978 | Whetham | |
| 4,665,393 A | 5/1987 | Wilder et al. | |
| 4,712,953 A | 12/1987 | Witzel et al. | |
| 4,740,117 A | 4/1988 | Schaff Deleury et al. | |
| 5,023,422 A | 6/1991 | Laughton et al. | |
| 5,404,021 A | 4/1995 | Mangano et al. | |

(Continued)

FOREIGN PATENT DOCUMENTS

DE    100 37 532 A1    2/2001

(Continued)

OTHER PUBLICATIONS

Translation of Japanese Notice of Rejection issued in connection with corresponding Japanese Application No. 2006-547065; Rejection Issued: Jan. 19, 2010; 3 sheets.

*Primary Examiner* — Boyer D Ashley
*Assistant Examiner* — Sara Addisu
(74) *Attorney, Agent, or Firm* — Alston & Bird LLP

(57) ABSTRACT

A laser-guided coordination hole tool for precisely drilling holes in large parts includes a positioning table, a bushing cavity for receiving drill bushings, a clamping device, and a laser target. A laser-guided coordination hole tool may include a software interlock to prevent drilling in an improper location on the part. A method of drilling coordination holes includes probing a part to determine its reference frame, rigidly affixing a laser-guided coordination hole tool to the part, probing a target on the laser-guided coordination hole tool to determine the reference frame for the laser-guided coordination hole tool, accurately positioning a drill bushing over the hole location, and drilling a hole. A system for drilling coordination holes includes a laser-guided coordination hole tool, a bushing, a tooling, a drill motor, a laser tracker, and a computer running a coordination-hole drilling program.

24 Claims, 9 Drawing Sheets

U.S. PATENT DOCUMENTS

| | | |
|---|---|---|
| 5,656,161 A | 8/1997 | Solomon et al. |
| 5,949,685 A | 9/1999 | Greenwood et al. |
| 5,950,503 A | 9/1999 | Amendolea |
| 6,019,554 A | 2/2000 | Hong |
| 6,220,099 B1 | 4/2001 | Marti et al. |
| 6,413,022 B1 | 7/2002 | Sarh |
| 6,488,451 B1 | 12/2002 | Hartman |
| 6,596,081 B1 | 7/2003 | Arnowitz et al. |
| 6,644,897 B2 | 11/2003 | Martinez et al. |
| 6,729,765 B2 | 5/2004 | Ni et al. |
| 6,796,014 B2 | 9/2004 | Sarh |
| 6,843,328 B2 | 1/2005 | Boyl-Davis et al. |
| 6,926,094 B2 | 8/2005 | Arntson et al. |
| 6,979,288 B2 | 12/2005 | Hazlehurst et al. |
| 2001/0022098 A1 | 9/2001 | Wirz |
| 2002/0111714 A1 | 8/2002 | Guthrie et al. |
| 2003/0091251 A1 | 5/2003 | Ni et al. |
| 2003/0095840 A1 | 5/2003 | Wang et al. |
| 2003/0210027 A1 | 11/2003 | Pedigo et al. |
| 2004/0187657 A1 | 9/2004 | Smith |
| 2004/0234352 A1 | 11/2004 | Vanderpol et al. |
| 2004/0244173 A1 | 12/2004 | Miller |
| 2004/0260422 A1 | 12/2004 | Greenwood et al. |
| 2004/0265081 A1 | 12/2004 | Buttrick, Jr. |
| 2005/0147477 A1 | 7/2005 | Clark |
| 2007/0180674 A1 | 8/2007 | Morden et al. |

FOREIGN PATENT DOCUMENTS

| | | |
|---|---|---|
| DE | 100 31 687 A1 | 1/2002 |
| JP | 07-299702 | 11/1995 |
| JP | 2001-310216 | 11/2001 |
| JP | 2003-530561 | 10/2003 |
| WO | WO 01/77613 A1 | 10/2001 |
| WO | WO 03/049899 A2 | 6/2003 |

LASER-GUIDED COORDINATION HOLE DRILLING

CROSS-REFERENCE TO RELATED APPLICATION

This application is a divisional of U.S. application Ser. No. 10/752,285, filed Jan. 6, 2004 now U.S. Pat. No. 7,384,220, which is hereby incorporated herein in its entirety by reference.

FIELD

The present disclosure relates generally to coordination hole drilling, and, more particularly, to coordination hole drilling of large production parts such as those constructed and assembled for aircraft or ships.

BACKGROUND

One activity which must be performed when building with large component parts, such as when building an aircraft or during shipbuilding, is drilling holes at various locations in these large parts. Such holes may be referred to as coordination holes because they are located at coordinate locations measured on the parts. The coordination holes are then used to affix a part to another part with corresponding coordinating holes such as by putting a fastener thru to hold multiple parts together. Each time the same part is replicated, coordination holes must be measured and drilled in the same locations, often requiring precise measurements and accuracy of drilling.

The present method of achieving the accuracy for drilling coordination holes in large parts involves using large numerically controlled machines on massive foundations in large, controlled environments. Massive foundations are required to achieve stiffness and accuracy for drilling. Large numerically controlled machines operate in five axes to properly locate and orient the holes to be formed in the parts. These machines are also expensive, difficult to set up, not easily moved, and hard to modify. In addition, the weight of a machine and the large work environment decrease the accuracy of drilling. In effect, the present method of drilling coordination holes in large parts is inflexible.

In addition, the present method of drilling coordination holes, using a large numerically controlled machine on a massive foundation, is not suited for drilling coordination holes in higher-level assemblies, such as wing boxes and assembled structures because in part due to the machine's inability to access smaller or internal recesses. Many types of large parts must be drilled to produce coordination holes. Configuring and adapting a large numerically controlled machine for many different parts is time consuming and labor intensive, making using a large numerically controlled machine on a massive foundation an impracticable solution for drilling coordination holes with many types of parts. A method, system, and apparatus to accurately drill holes, including coordination holes, in large parts while providing the flexibility of a portable drilling device are needed. In addition, a tracking laser system that combines inspection, manufacturing, and in-process measurement into one system with a drilling apparatus is needed.

SUMMARY

A laser-guided coordination hole drilling apparatus is provided. A laser-guided coordination hole drilling apparatus of certain advantageous embodiments is portable and does not require large or massive foundations and may be manual, semi-automatic, or automatic. A laser-guided coordination hole drilling apparatus of one embodiment includes a positioning table that allows movement in at least one plane, typically the x-y plane; a bushing cavity for receiving a target bushing and drill bushings; a clamping device, typically screw clamps or vacuum cups, for securing the positioning table to a part into which holes will be drilled; and a laser target on the positioning table, typically proximate to the bushing cavity or in a target bushing recessed in the bushing cavity, for allowing a laser tracker to locate the position of the positioning table and bushing cavity.

An x-y positioning table of an embodiment of the present disclosure may include manual screw adjustments for movement in the x- and y-axes or automatic motors, such as servomotors, for movement in the x- and y-axes. A laser target for an embodiment of the present disclosure may be an open-air, corner-cube optical target or other retroreflector. An embodiment of a laser-guided coordination hole drilling apparatus may include two-staged, concentric vacuum cups for rigidly affixing the positioning table to a part into which a hole will be drilled. Another embodiment of a laser-guided coordination hole drilling apparatus may be designed to allow the positioning table to drill holes at an angle to a drill motor mounted to the positioning table. Alternatively, a positioning table of an embodiment of the present disclosure may be a dual rotating nonconcentric positioning table.

Another embodiment of a laser-guided coordination hole drilling apparatus may include a software interlock to prevent drilling in an improper location on the part. A software interlock may actuate a mechanism to prevent a drill or a drill bushing from being inserted into the bushing cavity, such as a pin that penetrates the bushing cavity. A software interlock may also be connected to a drill motor to prevent the drill from operating when a laser-guided coordination hole drilling apparatus is not located at the proper location for drilling the coordination hole.

A method of drilling coordination holes is provided. A method of drilling coordination holes of one embodiment includes steps of probing a part to be drilled with a laser tracker to establish a reference frame for the part, determining the reference frame of a part relative to the laser tracker, using the laser to highlight the hole location to be drilled and rigidly affixing a laser-guided coordination hole tool to the part near the hole which will be drilled in the part, probing a laser target on the laser-guided coordination hole tool with the laser tracker to establish a reference frame for the laser-guided coordination hole tool, determining the reference frame for the laser-guided coordination hole tool relative to the laser tracker and the part, positioning a drill bushing rotatably secured in the laser-guided coordination hole tool proximate the hole location, and drilling a hole through the drill bushing, typically using a drill bit or other cutting or milling tool.

In one embodiment of a method for drilling coordination holes probing a laser target and determining the laser-guided coordination hole reference frame may be performed automatically. In another embodiment, positioning the drill bushing proximate the hole location may be performed manually, semi-automatically, or automatically. In an embodiment of a method for drilling coordination holes, the step of positioning the drill bushing proximate the hole location may be performed by locating the drill bushing at an intersect with a normal vector from the hole location or by locating the drill bushing such that a vector from the drill bushing intersects the hole location normal the surface of the part at the hole location.

A system for drilling coordination holes is provided. A system for drilling coordination holes of one embodiment includes a laser-guided coordination hole drilling apparatus, a drill bushing removeably and rotatably secured in a drill bushing cavity of a positioning table of the laser-guided coordination hole drilling apparatus, a tool extending through the drill bushing, a drill motor affixed to the tool for drilling through the drill bushing, a laser tracker optically connected to a laser target on the laser-guided coordination hole drilling apparatus, a processor interoperably connected to the laser tracker, and a coordination-hole drilling software program running on the processor.

An embodiment of a system for drilling coordination holes may include a movement monitoring routine of the software program interoperably connected to the laser tracker and/or a software interlock routine interoperably connected to the drilling apparatus, drill bushing, or drill motor. These subroutines of the software program may prevent accidental drilling of a hole at an improper location.

Embodiments are more suitable for machining coordination holes on numerous types of parts and on parts of various shapes and sizes. The size of a drilling apparatus of the present disclosure provides flexibility to drill or machine coordination holes in parts at positions that would otherwise be difficult or impossible to machine with a large numerically controlled machine even if the part were re-oriented for the large numerically controlled machine. Embodiments of the present disclosure further provide the ability for parallel drilling, where more than one machining operation is performed on a part at one time. The size of a drilling apparatus of the present disclosure also eliminates the need for a large work environment, which may reduce drilling accuracy, required for a large numerically controlled machine.

BRIEF DESCRIPTION OF THE DRAWINGS

Figure 1:
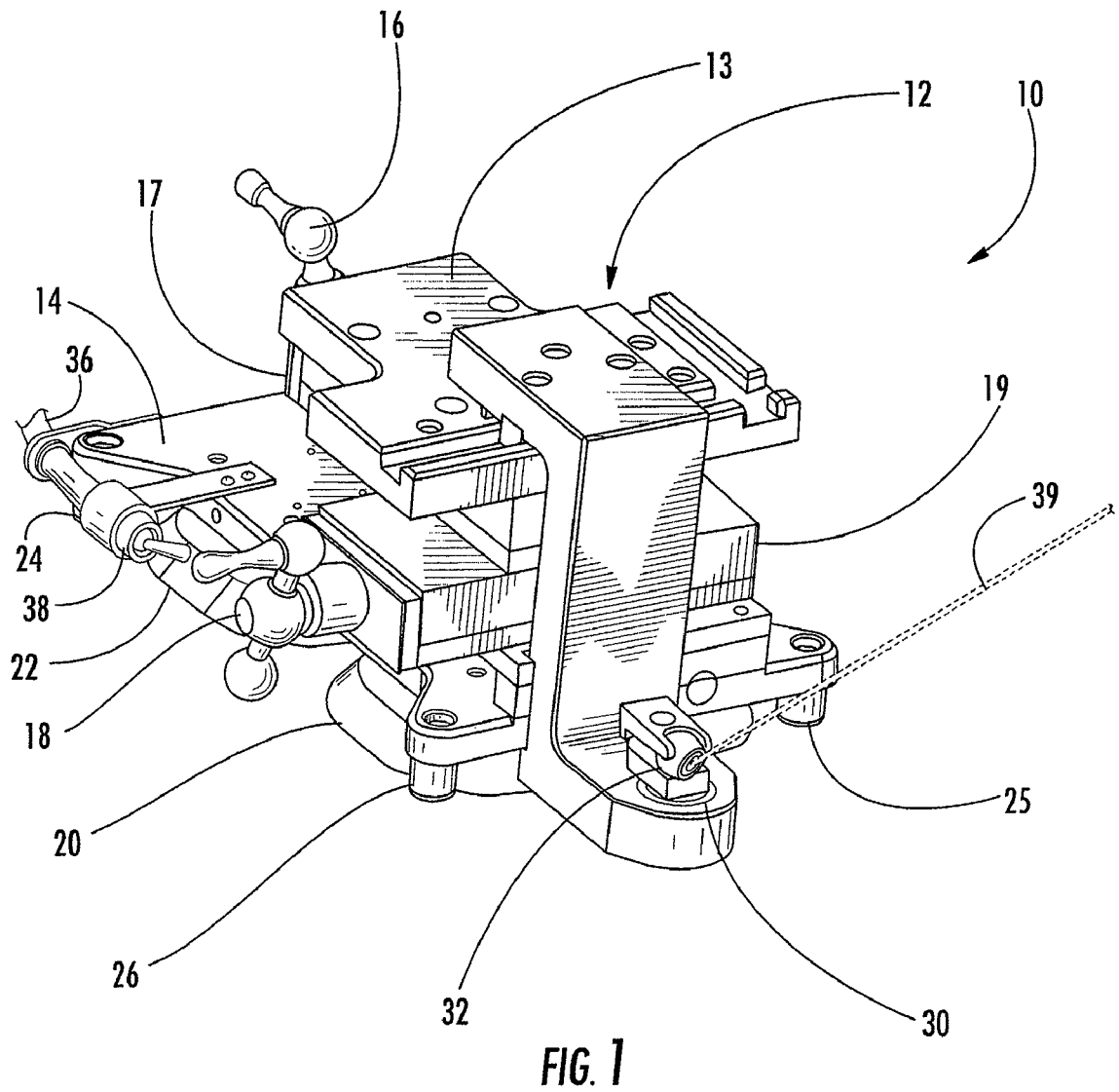
Figure 2:
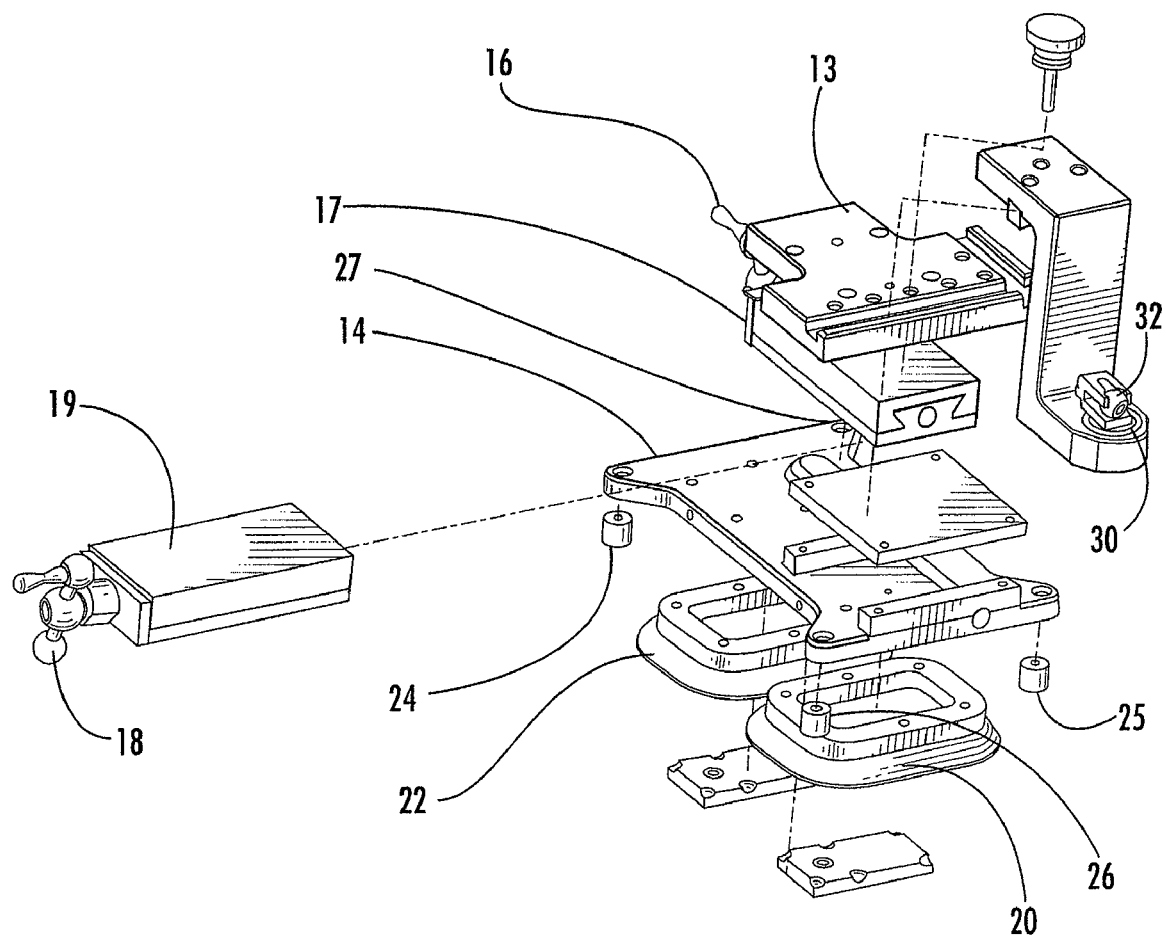
Figure 3:
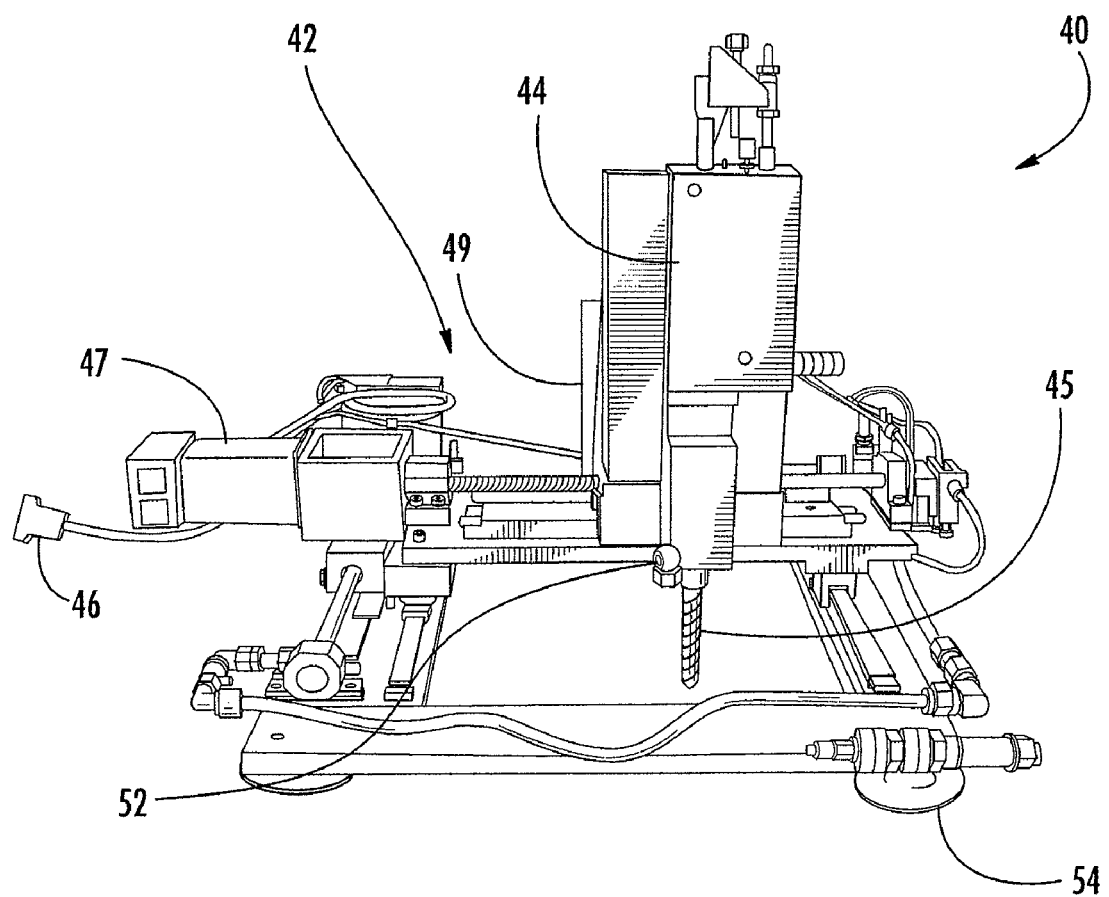
Figure 4:
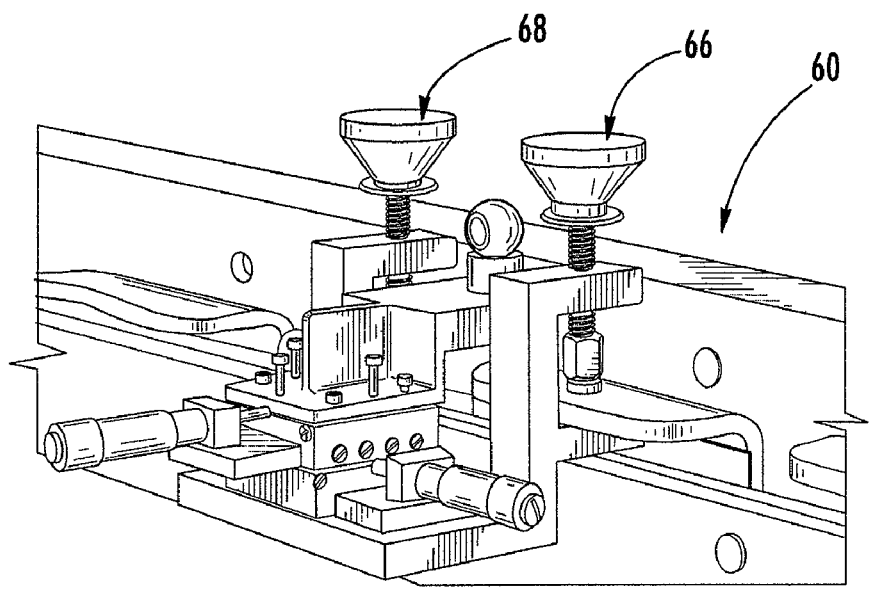
Figure 5:
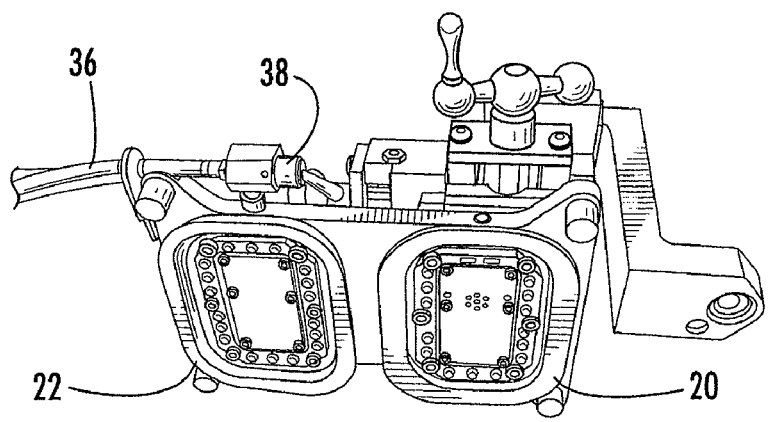
Figure 6:
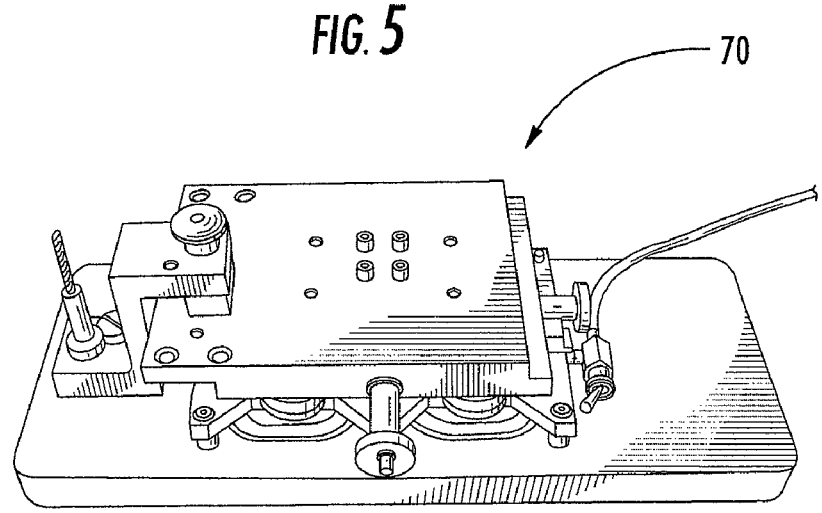
Figure 7:
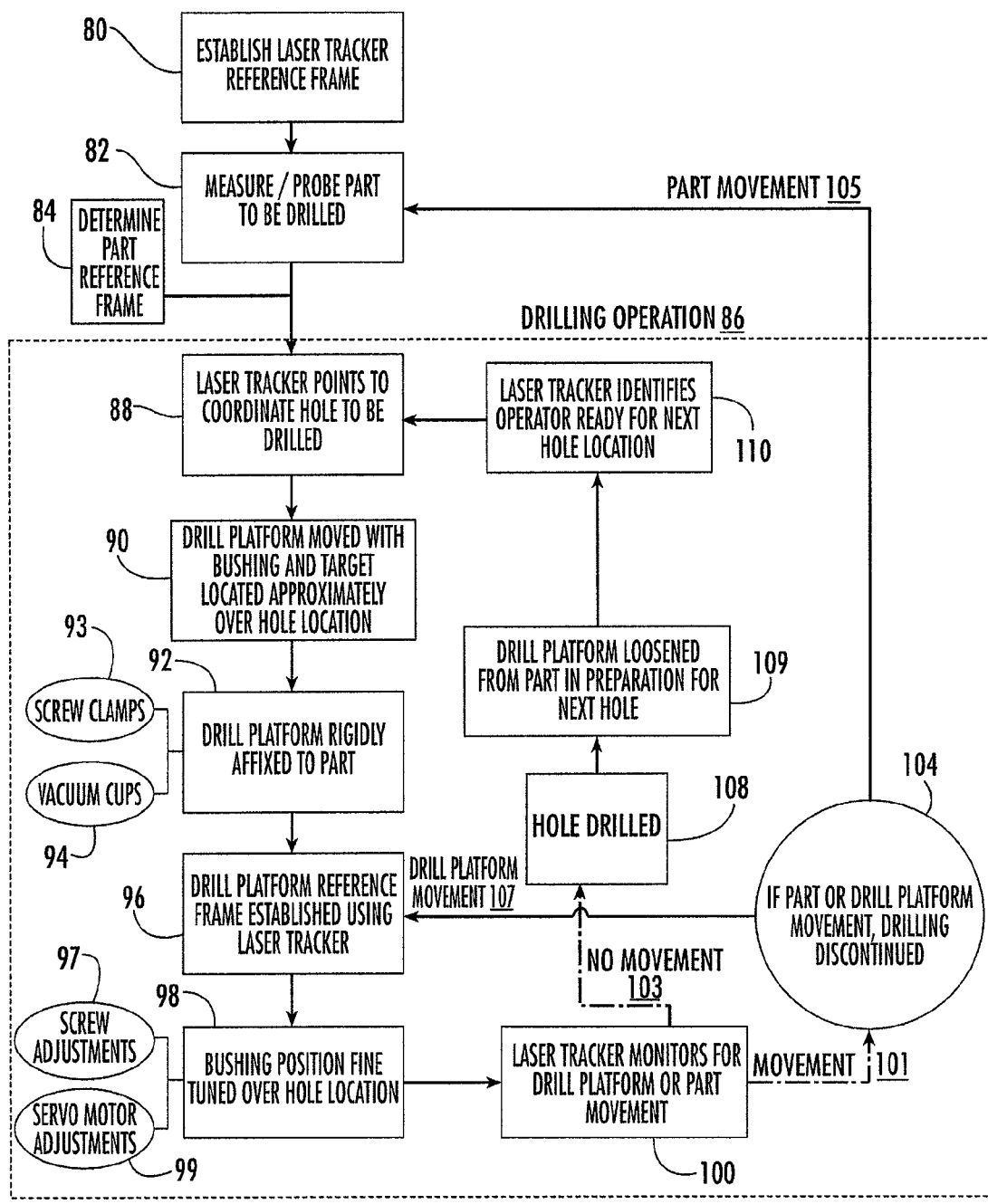
Figure 8A:
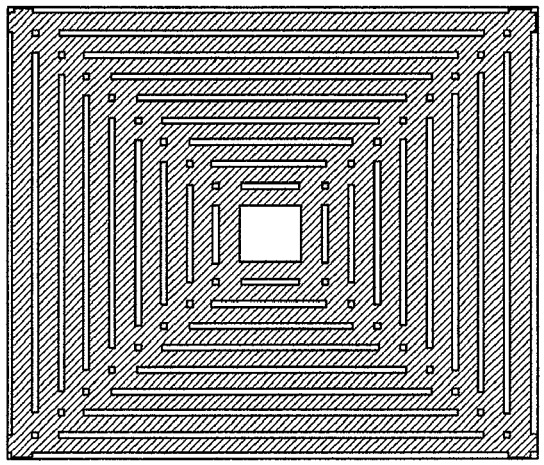
Figure 8B:
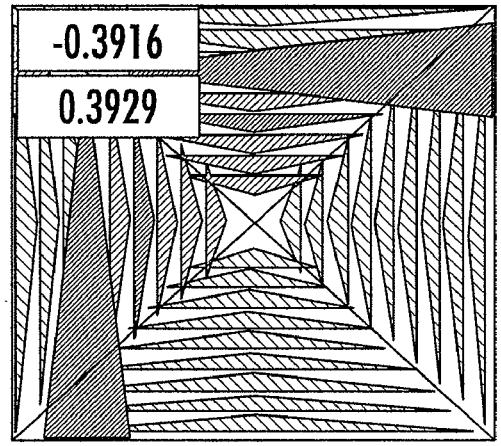
Figure 8C:
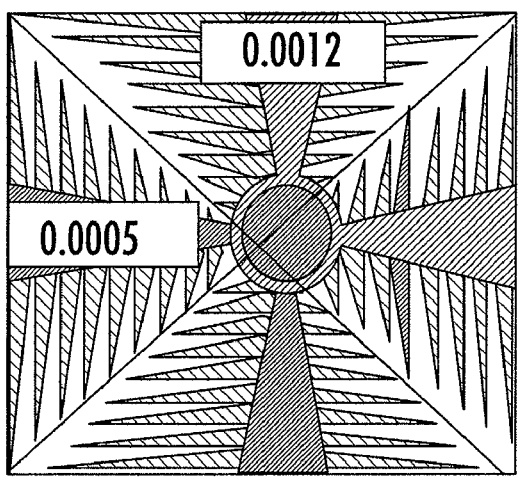
Figure 8D:
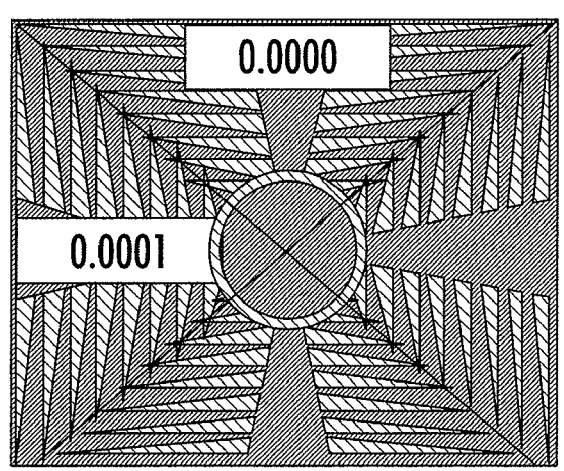
Figure 9:
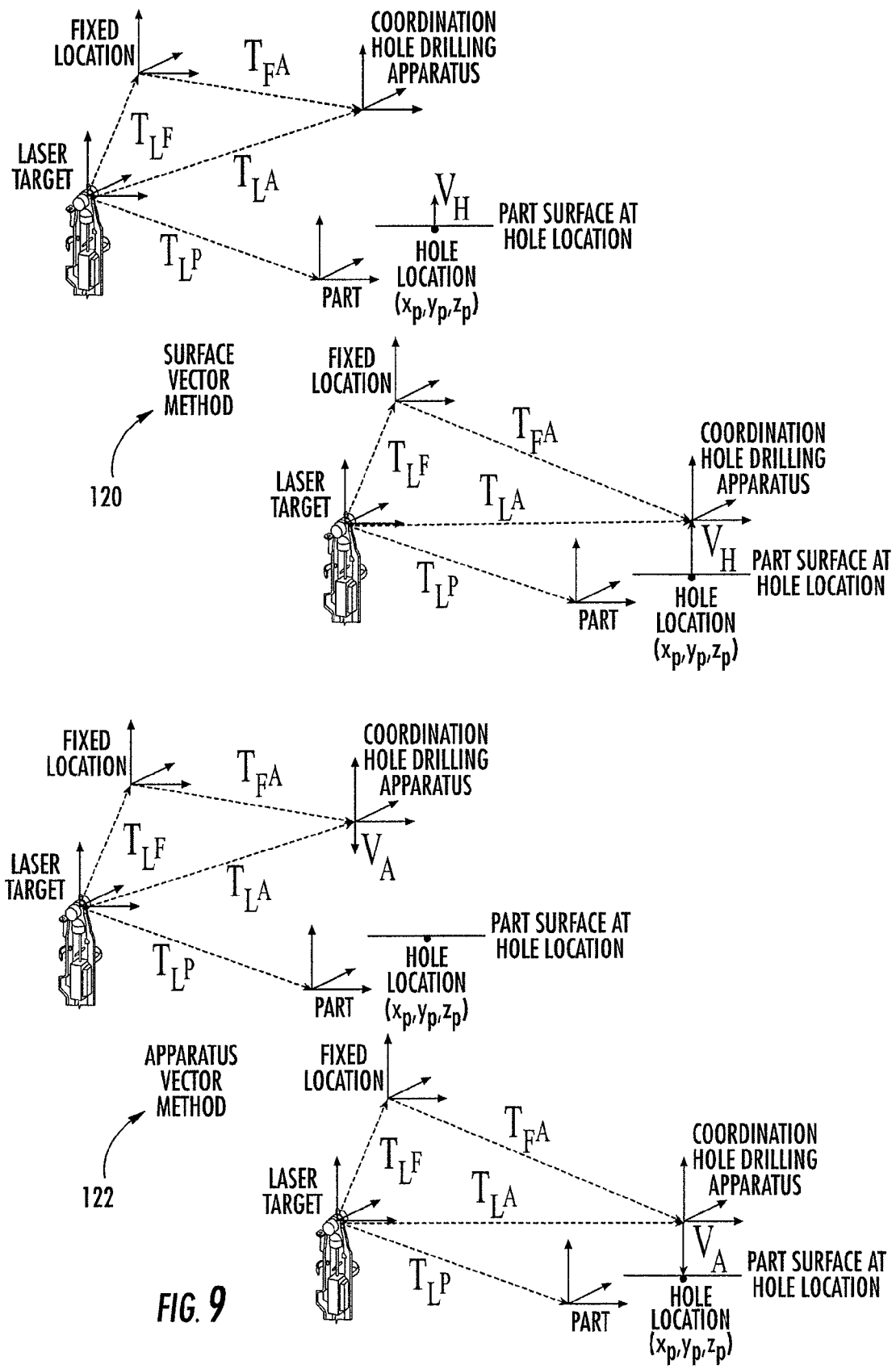
Figure 10:
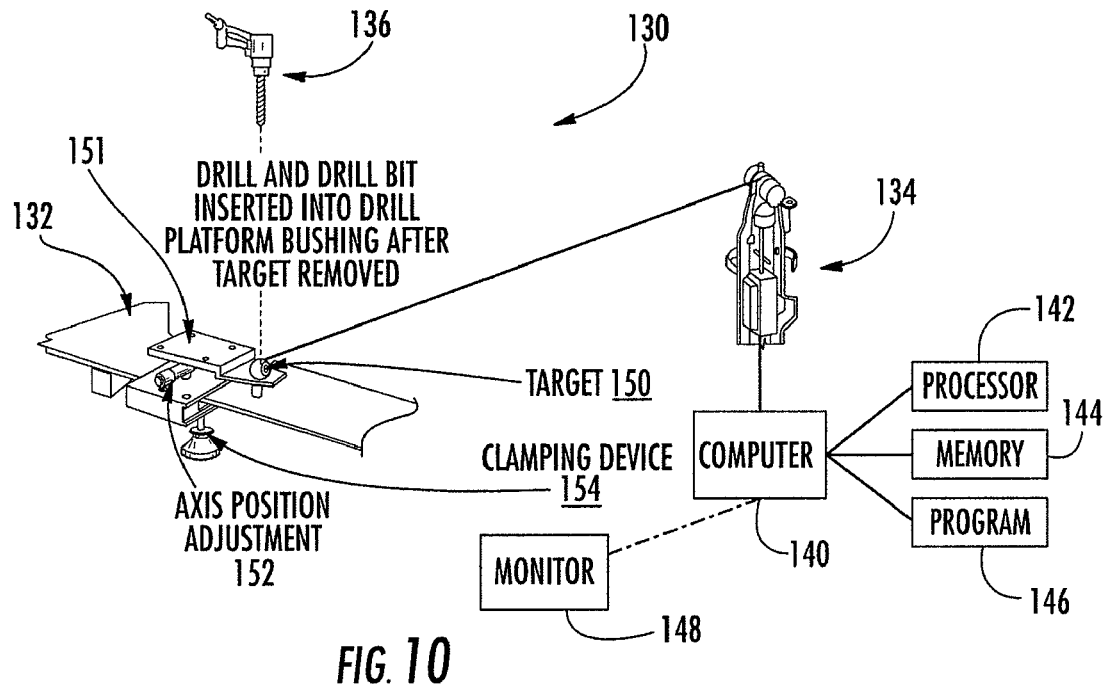
Figure 11:
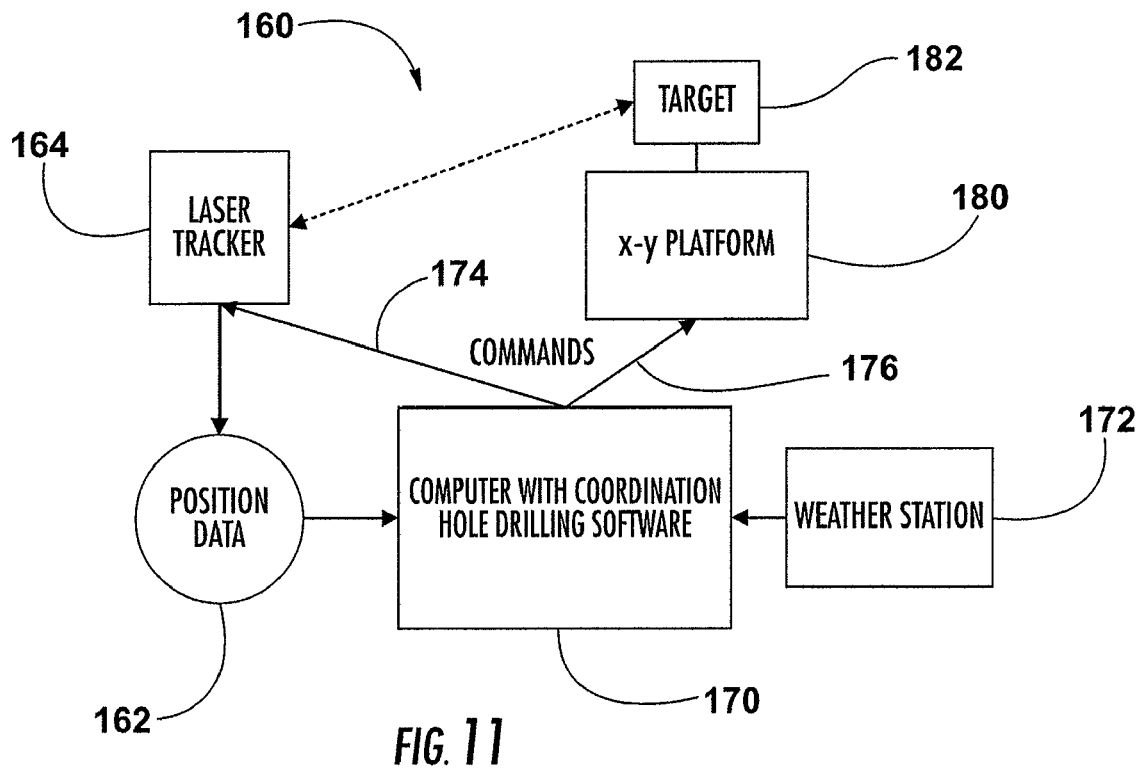
Figure 12:
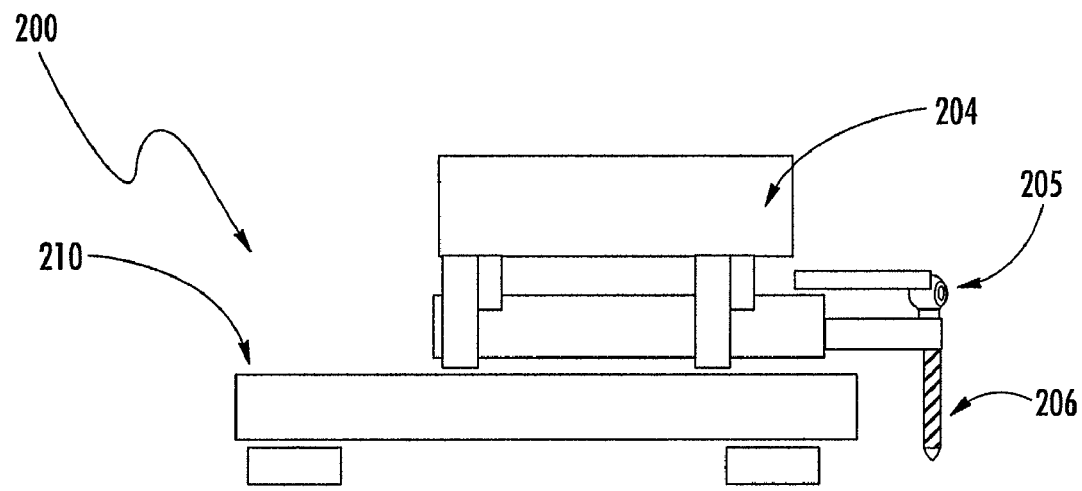
Figure 13:
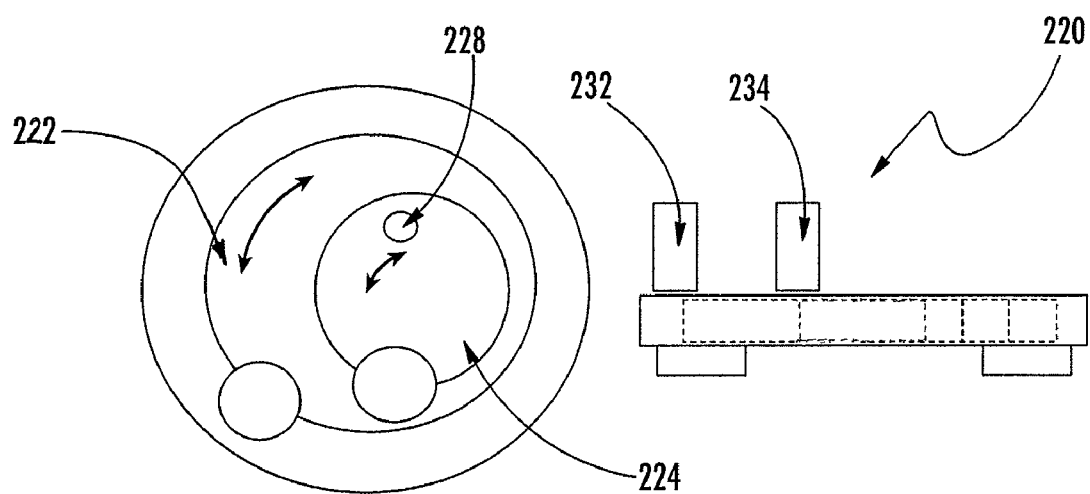

Having thus described the disclosure in general terms, reference will now be made to the accompanying drawings, which are not necessarily drawn to scale, and wherein:

FIG. 1 is a perspective view of a coordination hole drilling apparatus of one embodiment of the present disclosure;

FIG. 2 is an exploded perspective view of one coordination hole drilling apparatus of FIG. 1;

FIG. 3 is a perspective view of a coordination hole drilling apparatus of another embodiment of the present disclosure;

FIG. 4 is a perspective view of a coordination hole drilling apparatus of yet another embodiment of the present disclosure;

FIG. 5 is a perspective view showing vacuum cups of one coordination hole drilling apparatus of FIGS. 1 and 2;

FIG. 6 is a perspective view of a coordination hole drilling apparatus of a further embodiment of the present disclosure;

FIG. 7 is a flow chart of a coordination hole drilling method of one embodiment of the present disclosure;

FIGS. 8A-8D are pictorial views of visual display embodiments for accurately positioning a coordination hole drilling apparatus of one embodiment of the present disclosure;

FIG. 9 is a schematic diagram of two techniques for determining a location to position a coordination hole drilling apparatus of one embodiment of the present disclosure;

FIG. 10 is a pictorial diagram of a coordination hole drilling system of one embodiment of the present disclosure;

FIG. 11 is a schematic diagram of a coordination hole drilling system of one embodiment of the present disclosure;

FIG. 12 is a schematic diagram of a coordination hole drilling apparatus with a drill configuration where a motor is approximately perpendicular to a drill bit of one embodiment of the present disclosure; and FIG. 13 is a schematic diagram of a dual rotating nonconcentric device of one embodiment of the present disclosure.

DETAILED DESCRIPTION

The present disclosure now will be described more fully hereinafter with reference to the accompanying drawings, in which preferred embodiments are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Coordination hole drilling apparatuses, methods of drilling coordination holes, and systems for drilling coordination holes of an embodiment of the present disclosure are described using the term drill and derivatives thereof. Drilling is intended to include other forms of cutting or milling, including, but not limited to, traditional drilling, helical milling, pocketing, ramping, slotting, shoulder milling, and other cutting or milling processes. Drilling applications and other drilling items include cutting applications with other tools and associated tooling items. Similarly, the term hole includes a recess formed by a cutting or milling tool. This lexicon is selected as a convenient means to describe and explain the present disclosure and is not intended to limit it to traditional drilling. One of ordinary skill in the art will identify descriptions of traditional drilling, such as where a drill bit is used rather than another cutting or milling tool, and will understand that a drill bit is but one example of a suitable tool.

While a primary use of embodiments of the present disclosure is in the field of aircraft construction and assembly, it will be appreciated from the following description that other embodiments are also useful for many types of construction and assembly, including, for example, shipbuilding, automobile manufacture, building construction and the like.

FIG. 1 is a perspective view of a coordination hole drilling apparatus of a first embodiment of the present disclosure, which may also be referred to as a coordination hole tool or a laser drill jig. A drilling apparatus 10 of one embodiment includes an x-y positioning platform or table 12. A positioning platform 12 allows for movement of a moveable portion 13 of the platform along one or more axes while a foundation portion 14 of the platform remains stable. An x-y positioning platform provides for movement along orthogonal axes, the x- and the y-axes. The movable portion 13 of a positioning platform for a drilling apparatus 10 defines at least a bushing cavity 30 for accepting bushings to hold a laser target 32 or receive different sized tools.

A positioning platform 12 may be supported by legs or feet 24 upon which the drilling apparatus 10 may rest against a part. Typically, the positioning platform 12 is in an approximately parallel plane to the plane of the part surface upon which the drilling apparatus 10 rests. The positioning platform 12 typically is in a plane perpendicular to the drilling axis such that the positioning platform 12 is normal to the part surface for drilling holes in a parallel surface application. A clamping device, such as screw clamps or vacuum cups, are used to secure the drilling apparatus to the part. In the embodiment shown in FIG. 1, two vacuum cups 20, 22 are located on the bottom side of the foundation portion 14 of the positioning platform 12 in such a manner that they contact the part upon which the drilling apparatus 10 rests in approximately the same plane in which the feet 24 rest against the part. These vacuum cups 20, 22 may be engaged with a switch 38 and air supply line 36 attached to a vacuum generator to secure the drilling apparatus 10 to the part.

To change the position of the bushing cavity 30, adjustments are made to the positioning platform 12 for movement in different axes. As shown in the embodiment in FIG. 1, manual screw adjustments 16, 17, 18, 19 may independently translate the bushing cavity 30 along the x- or y-axes. Also shown in FIG. 1 is an example laser tracker line-of-sight 39 for a laser tracker to determine the reference frame of the positioning table and to position a bushing cavity in the positioning table relative to a desired coordination hole.

FIG. 2 is an exploded perspective view of one coordination hole drilling apparatus 10 of FIG. 1. The exploded view in FIG. 2 provides one example of the manner in which a drilling apparatus may be constructed, although a drilling apparatus may be constructed in a variety of manners to suit any number of applications. In this embodiment, manual screw adjustments 16, 17, 18, 19 are positioned between a securable foundation 14 of the positioning platform and a movable portion 13 of the positioning platform. Two vacuum cups 20, 22 and four legs 24, 25, 26, 27 are secured to the bottom of the positioning platform 12, although the apparatus may include any number of vacuum cups and legs. While typically located at the bushing cavity location, a laser target 32 may be mounted in any predefined position on the movable portion 13 of the positioning platform. The laser target 32 provides a reference location on the movable portion 13 of the positioning platform from which the x- and y-axes positions of the bushing cavity 30 may be determined, as described hereinafter. A laser target 32 may be any type of appropriate reflective device for use with a laser tracker, such as a 0.5 inch diameter retroreflector target or a 1.5 inch open-air, corner-cube optical target. The bushing cavity 30 of the movable portion 13 of the positioning platform is designed to accept bushings that may hold a laser target or receive tools for drilling holes using the drilling apparatus 10. Bushings may be secured to the drilling apparatus using a locking screw or pin or any other method to secure the bushing. A modified drill bushing 0.0005 to 0.001 inches larger than the drill bit diameter may be used with a laser-guided coordination drilling apparatus and secured in a bushing cavity of the drilling apparatus, although other relative diameters may also be employed. A drill bushing may be modified for additional length to improve the orientation and alignment of a tool for drilling into the surface of a part, including an embodiment where the drill bushing is longer than the positioning table is thick, such as where the drill bushing is a cylindrical extension from or through a portion of the positioning table.

The positioning platform 12 may be adjusted manually, semi-automatically, or automatically. The embodiment shown in FIGS. 1 and 2 uses manual micrometer screw adjustments 16, 17, 18, 19 for the positioning platform 12. An automatic positioning platform 42 is shown in the perspective view of a coordination hole drilling apparatus 40 of a second embodiment of FIG. 3. The drilling apparatus of this second embodiment includes automatic servo motors 47, 49 for adjusting the x- and y-axes of the positioning platform. The embodiment of a coordination hole drilling apparatus 40 shown in FIG. 3 also includes an automated drill motor 44 mounted to the positioning platform in-line with a drill bit 45 oriented normal to the plane upon which the drilling apparatus 40 rests against the part. These automated servo motors 47, 49 and drill motors 44 are controlled by commands from a computer or other controller through a communication cable 46, although wireless communication may also be employed. The drilling apparatus of the embodiment of FIG. 3 includes a fixed laser target 52 that does not need to be removed from a bushing or bushing cavity of the positioning platform before drilling begins. To use a fixed laser target with a drilling apparatus, the system must be calibrated for the offset of the target from the drill bushing. A similar fixed target 205 is used with the 90-degree drill motor embodiment of FIG. 12.

FIG. 4 is a perspective view of a coordination hole drilling apparatus 60 of a third embodiment of the present invention. The embodiment shown in FIG. 4 is an example of a coordination hole drilling apparatus that includes screw clamps 66, 68 to rigidly affix the drilling apparatus 60 to a part.

FIG. 5 is a schematic diagram showing vacuum cups 20, 22 of the coordination hole drilling apparatus 10 of FIGS. 1 and 2. Vacuum cups allow a drilling platform to easily be positioned on a part, even against the pull of gravity, such as drilling upside down. The vacuum cups 20, 22 of this embodiment are two-staged, concentric vacuum cups for rigidly affixing the positioning table to a surface on the part. A two-stage vacuum cup provides a low vacuum for positioning and a high vacuum for providing additional stability during drilling. However, as exemplified by the screw clamps 66, 68 in the third embodiment shown in FIG. 4, any type of clamping device that may rigidly affix a coordination hole drilling apparatus to the surface of a part for drilling may be used with a drilling apparatus.

FIG. 6 is a perspective view of a coordination hole drilling apparatus 70 of a fourth embodiment. The embodiment shown in FIG. 6 is a more compact version of a drilling apparatus. This embodiment is just one more example of the variety of design possibilities for creating a drilling apparatus. The drilling apparatus is typically designed based upon the intended use and application. For example, a smaller device may be more practical for delicately drilling smaller holes or repeatedly moving the drilling apparatus to drill a large plurality of holes. Conversely, a larger drilling platform may be beneficial for drilling applications that require more force or drilling a smaller number of holes. Regardless of the application, a drilling apparatus may be designed and made from appropriate materials to provide appropriate hardness, stiffness, and accuracy for precision hole drilling, such as granite, tungsten carbide, through-hardened high carbon steel, aluminum, composites, or other metal or material that provides drilling accuracy required for a particular application.

FIG. 7 is a flow chart of a coordination hole drilling method of one embodiment. The reference frame for a laser tracker must be established 80. As known to those skilled in the art, this process can be done in a variety of ways, such as determining the position of a laser tracker to a fixed point or using the laser tracker itself for the primary reference frame. The laser tracker is used to measure or probe the part to be drilled 82 to determine the reference frame of the part 84. This can be done by indexing key characteristics for locations on the part such as part edges, index holes, surfaces, or other tooling locators. Locations of the part may be measured by the laser tracker using optical targets at each location.

The reference frame of the part may be measured or probed 82 in a variety of methods as known in the art. Similarly, one of ordinary skill in the art may select the appropriate method and instruments necessary to measure a part or positioning table reference frame using a laser tracker and, where required, laser targets. The method used likely will be selected depending on factors such as the type, size, or shape of the part being drilled or the method of drilling. By way of example, a part reference frame may be measured using a three point method. A three point method uses a minimum number of points to determine a part transformation relative to the laser tracker. A first point defines a zero location, a second point defines a location along the y-axis, and a third point establishes a reference to the x-y plane and the location along a z-axis. The third point must be offset from a straight line in order to establish a third orthogonal axis, and typically the third point is located as far as practical from a straight line or at a distance that best represents the part being measured to increase the accuracy of the measurement of the part reference frame.

Another method for measuring a part reference frame is an n point method. An n point method is a least squares fit of greater than three points. This method is good for re-indexing drilled parts or locating known parts on a tool.

Other methods of measuring part references include acquiring datums to key characteristics of a part that represent how the part will be put together. Planes, lines, and holes can be used in combination to define all degrees of freedom of the part.

Once the part has been measured or probed 82 to allow for a determination of the part reference frame 84, a laser tracker may point to a location for a coordinate hole to be drilled on the part 88. A laser tracker typically is computer controlled with a location of the incident laser predefined in relation to the part reference frame. An operator places a drilling apparatus on the part such that the bushing cavity is located on the part approximately where the hole will be drilled 90. At this location, the laser-guided coordination hole drilling apparatus is rigidly affixed to the part 92, such as by using screw clamps 93 and vacuum cups 94 to secure the drill platform to the part.

Using the laser target on the drilling apparatus, the laser tracker establishes a reference frame for the drill platform 96. Then the positioning platform of a drilling apparatus is adjusted so as to fine-tune the bushing cavity position over the hole location 98. This may be achieved manually using micrometer screw adjustments 97, semi-automatically using servo motors 99 and manual screw adjustments 97, or automatically using servo motors 99. This accurate positioning of the bushing cavity over the hole location may be achieved in a number of measurement and calculation methods. By way of example, FIG. 9 provides two surface normal methods that may be used with a coordination hole drilling method of an embodiment. Once the reference frame of the drilling apparatus is established, an internal laser may be utilized to control subsequent movement of the positioning platform. An internal laser, typically pointing to a target near the tip of a drilling tool, is particularly useful where a drilling application may prevent an external laser tracker from continuing to effectively track the target, such as where chips from the drilling would block the external laser or where the machine rotates out of the line-of-sight of the external laser tracker. An internal laser tracker, however, is only used for additional accuracy through this application and laser track refers to an external laser tracker. Once the bushing cavity has been accurately positioned above the hole location 98, a drill bushing or tool bushing may be rotatably secured in the bushing cavity and a hole may be drilled 108 in the part through this bushing.

During the drilling process 108, the laser tracker may be used to monitor 100 for part 105 or drilling platform 167 movement that might compromise the precision of the coordination hole being drilled. If movement is detected 101, the operator may be notified and/or the drilling may be terminated automatically. This type of in-process monitoring and control allows an operator to know immediately if something breaks or is wrong with the drilling operation.

Once the hole has been drilled 108, the operator may loosen the drilling platform from the part 109, at which point the laser tracker identifies the movement of the drilling platform and understands that the next hole is ready to be drilled 110. Once the laser tracker identifies that the operator is ready for the next hole location, the laser tracker points to the next hole location to be drilled, and the drilling cycle 86 begins again. If the drilling apparatus is automated with a self-fed drill motor, the laser tracker may automatically point to the next hole to be drilled as soon as the automated drilling motor has completed drilling the hole. Also, the operator may provide an input indicating that the laser tracker should move on to the location of the next hole or the laser may automatically point to the next hole location, such as once the target has maintained a tolerance band of the position being drilled over a specified time period.

FIGS. 8A-8D show pictorial views of visual display embodiments for accurately positioning a coordination hole drilling apparatus. If the drilling apparatus does not have a fully automated positioning platform, an operator may be required to position the bushing cavity over the hole location. If the positioning platform is manual or semi-automatic, an operator may fine-tune the location of a bushing cavity relative to a desired hole location. To instruct the drilling operator to where the positioning platform is to be adjusted, a computer display may be used to represent to the operator the present location of the positioning platform or, alternatively, the required adjustments to the positioning platform. This instruction may be accomplished using a visual display to allow the operator to see the direction in which the positioning platform must be moved. The displays shown in FIGS. 8A-8D are examples of a logarithmic measurement system that shows an operator which direction in which to move a positioning platform and compensates for the range of movement required to accurately position the bushing cavity. By using a logarithmic scale, the visual display may compensate for initial adjustments that must be made in large degree and minute adjustments made at the end of the positioning routine. As required adjustments decrease from coarse to fine, the display can visually display the increased sensitivity, providing the operator the ability to visually see the resulting and additionally required fine adjustments. One of ordinary skill in the art will recognize that other methods are available to provide visual cues to an operator for adjustments to a positioning platform. Once the bushing cavity is accurately positioned, the display may change in such a manner that the operator may identify that the positioning platform is ready to be used for drilling the hole.

Various measurement and positioning methods may be used to accurately locate a bushing cavity proximate a hole location. FIG. 9 is a schematic diagram of two techniques for determining a location at which to position a coordination hole drilling apparatus. The first example, a surface normal method 120, projects a normal vector from the surface of the part at the hole location with the direction of the vector normal to the surface and pointing outwardly from the surface. A drilling apparatus may then be positioned with the laser target oriented at an intersect with the normal surface vector from the hole. This technique for positioning a bushing cavity over a hole location is particularly useful when the application involves the surface of the part being parallel to the x-y plane of the positioning platform. This technique often works well with manual precision screws to orient the positioning platform, usually resulting in a lighter, smaller drilling apparatus that is not as complicated as a drilling platform with automatic servo motors to control the positioning platform and/or an automatic drilling unit.

A second exemplary technique for positioning a bushing cavity over a hole location is embodied in a calculated surface normal method or apparatus vector method 122. In this method the positioning platform is moved until a calculated vector from the bushing cavity to the surface of the part intersects a hole location orthogonal to the surface of the part at the hole locator. This method requires that the reference frame of the drilling apparatus be established, typically determined by moving the positioning platform to positions establishing an orthogonal reference frame of the positioning platform which establish the reference frame of the drilling apparatus relative to the part. Once the reference frame is determined, an imaginary normal vector is projected from the bushing cavity location down to an intersect with the part. The laser tracker is then used to assist the positioning platform to move in such a manner as to intersect the vector with the location where the hole will be drilled on the part. This method is simplified when automated servo motors are used with the positioning platform, such that the orthogonal positions to establish the drilling apparatus reference frame can be established automatically, and then the positioning platform can be moved with the same automatic servo motors. Other techniques for positioning a bushing cavity over a hole location may be utilized however.

FIG. 10 is a pictorial diagram of a coordination hole drilling system 130 of one embodiment. The embodiment shown in FIG. 10 depicts the interaction between a drilling apparatus 132, a laser tracker 134, and a manual drill 136. A controller or a computer system 140, typically with a processor 142, memory 144, and software program 146, controls a laser tracker 134 that identifies a laser target 150 mounted to a positioning platform 151 of a laser-guided coordination hole drilling apparatus 132. Although shown separately, the computer software program 146 may be stored in memory 144 and accessed by the controller to control the operation of the laser tracker 134. Some activities that the laser tracker 134 may perform include measuring or probing the part to be drilled, pointing to a location where a hole is to be drilled, measuring for the reference frame of the positioning platform, assisting the positioning platform to orient a bushing or bushing cavity accurately in line with a hole location and monitoring the drilling apparatus and part during the drilling process for movement that may interfere with the precision hole drilling; each of which may be directed by a respective course of one software program.

A portable drill 136, such as a handheld drill, possibly operated either electrically or pneumatically, is generally used to drill holes through a drill bushing secured to the positioning platform in a bushing cavity. The orientation and alignment of the positioning platform of a drilling apparatus is intended to allow the drill and tool secured in the drill motor to accurately drill a coordination hole. This drilling process may be assisted by a visual monitor or display 148 to assist an operator during coordination hole drilling. A monitor 148 may be a heads-up display, a cathode ray tube or liquid crystal display positioned near the operator, a remote display mounted to a visible location on the drilling apparatus, a display projected on to the part, or any other visual monitor or display technique to allow an operator to see visual information about the coordination hole drilling system. Typically, a computer monitor is located near the laser tracker to display visual cues for an operator. The display 148 may provide an operator the ability to manually fine-tune a bushing cavity location by presenting a visual logarithmic image to assist the operator to make necessary adjustments depending upon the degree of precision required. Example embodiments of a logarithmic display are presented in FIG. 8. Other types of visual information may be designed to provide an operator the same type of information provided by a visual logarithmic image.

An example of a laser tracker that may be used with a system for drilling coordination holes is a helium neon laser operating at 632 nanometers using an interferometer to track the movement of the target relative to the laser tracker and an absolute distance meter (ADM) including an infrared laser diode operating at 720 nanometers with a modulating signal, typically between 750 and 920 megahertz (MHz). An absolute distance meter included in a laser tracker is intended to allow for beam breakage of the interferometer. An absolute distance meter re-acquires the target when the interferometer beam is broken. Such a laser tracker may require a minimum distance of 79 inches from the laser tracker to the target and has a range of approximately 131 feet. Over this range, the laser tracker may have a resolution of 0.00004 inches and an accuracy of 0.002 inches three sigma. When a target is acquired by the example laser tracker, the laser tracker will visibly center on the target and provide a precise distance measurement using the absolute distance meter.

FIG. 11 is a schematic diagram of a coordination hole drilling system 160 of one embodiment. This embodiment is similar to the embodiment shown in FIG. 10, except the embodiment in FIG. 11 shows communication commands 176 between the computer 170 and an x-y platform 180 indicating the possibility that a positioning platform may be automated using servo motors which require positioning commands 176. This exemplary embodiment also shows the direction of information flow from one part of the system to another. For example, the laser tracker provides position data 162 to the computer. The computer provides laser tracker commands 174 to the laser tracker 164 and positioning commands 176 to the positioning platform 180. The laser tracker 164 and the target 182 provide information back and forth, this two way communication representing reflected laser signals between the laser tracker and the target. A weather station 172 may also provide temperature and other weather-related readings of the workspace to the computer 170 for calculation adjustments to improve the accuracy of the coordination hole drilling.

A system of the present disclosure uses portable tools, and a laser-guided coordination hole apparatus of the present disclosure, with software running on a computer to control the interaction of a laser tracker and the drilling apparatus to provide a method of coordination hole drilling. A coordination hole drilling system provides high accuracy for drilling coordination holes. For example, the drilling may be within a tolerance of 0.002 inches, although the tolerance may be increased or decreased depending on the required precision. By not having a massive foundation, a large work space is not required for a portable drilling apparatus. This allows for smaller temperature variations that may improve the accuracy of drilling. For example, smaller work spaces may be temperature controlled rooms that reduce the temperature variations in the work space. Also, the portability and ease of adaptability of a laser-guided coordination hole drilling apparatus reduces lead times for acquiring and building drilling systems to manufacture parts. A system for drilling coordination holes of the present invention integrates the metrology of machines with part-based coordination hole drilling without using a machine tool. A system for drilling coordination holes provides an accurate way to drill coordination holes in five axes with only two degrees of freedom. The drilling apparatus is fixed on the part in three degrees of freedom, and the positioning platform provides an additional two degrees of freedom. Together, the placement of a drilling apparatus and a positioning platform of the drilling apparatus, provide the ability to drill coordination holes in five axes with only two adjustable degrees of freedom once the drilling apparatus is fixed on the part. If the placement of a drilling apparatus of the present invention and alignment of the positioning platform eliminate one degree of freedom due to corresponding alignment, an angular bushing may be used to provide an additional degree of freedom. An angular bushing may be angled at a fixed degree with a fixed rotational position in the bushing cavity or may be adjustable either rotationally or angularly. A system of the present disclosure also allows for parallel drilling operations, or multiple drilling, on the same part. These operational flexibility features may decrease the flow-through in a factory during construction. Different drilling operations may drill different sets of similar holes to reduce operation time by decreasing the number of times a drill bit or a bushing size must be changed. Less build-up and/or set-up is required to drill coordination holes in a part with the system of the present disclosure. Furthermore, a system of the present disclosure has the flexibility to be used in a variety of manners, including for example, the ability to drill hinge lines on a part by projecting a vector along the hinge line where coordination holes will be drilled.

FIG. 12 is a schematic diagram of a coordination hole drilling apparatus 200 of one embodiment with a drill configuration where the drill motor 204 is approximately perpendicular to the drill bit 206. As can be seen in the schematic diagram, the drill motor 204 is mounted horizontally on the positioning platform 210 rather than mounted in-line with the direction of a vector between the bushing cavity and the hole location. A 90-degree drill motor 204 may be used in place of the linear drilling configuration, simplifying the transformation of a reference frame from the drilling apparatus to the laser tracker and reducing or eliminating the need to incorporate a vector to or from the hole location. This type of drilling apparatus may be less sensitive to rotation. This configuration is just another example of different design options that may be embodied in a laser-guided coordination hole drilling apparatus. Each of these advantages may reduce the cycle time for drilling a coordination hole.

FIG. 13 is a schematic diagram of a dual rotating nonconcentric positioning device 220 of one embodiment. A dual rotating nonconcentric positioning device may be used for controlling the movement of a positioning platform to provide improved precision for generating holes and allow for a more compact drilling apparatus. The two nonconcentric portions 222, 224 rotate, typically with positioning motors 232, 234, in the same plane to achieve rigid positioning of a drill bushing 228. A dual rotating nonconcentric positioning platform may also be used to machine orbital holes.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of drilling coordination holes, comprising:
   affixing a laser-guided coordination hole drilling apparatus including a positioning platform to a part to be drilled proximate a hole location;
   probing a laser target on the laser-guided coordination hole drilling apparatus with a laser tracker;
   determining a tool reference frame of the laser-guided coordination hole drilling apparatus relative to the laser tracker and the part based upon said probing of a laser target;
   positioning the positioning platform relative to the part while the laser-guided coordination hole drilling apparatus remains affixed to the part such that a predefined portion of the positioning platform that will support a drilling tool is positioned proximate the hole location based upon a part reference frame and the tool reference frame; and
   drilling a hole with the drilling tool.

2. The method of claim 1, wherein probing a laser target and determining the tool reference frame of the laser-guided coordination drilling apparatus are performed automatically.

3. The method of claim 1, wherein the positioning the drill bushing proximate the hole location is performed at least two of manually, semi-automatically, and automatically.

4. The method of claim 1, wherein positioning the predefined portion of the positioning platform proximate the hole location comprises aligning a normal vector from the center of the hole location through the center of the predefined position.

5. The method of claim 1, wherein positioning the predefined portion of the positioning platform proximate the hole location comprises aligning the predefined position such that a vector from the center of the predefined position intersects the center of the hole location normal the surface of the part at the hole location.

6. The method of claim 1, wherein drilling a hole is performed using one of a drill bit and a milling tool.

7. The method of claim 1, wherein drilling a hole with a drilling tool is performed manually.

8. The method of claim 1, further comprising:
   probing the part to be drilled with the laser tracker; and
   determining the part reference frame relative to the laser tracker based upon said probing of a part.

9. The method of claim 1, further comprising removably securing the laser target in a bushing cavity defined by the predefined portion of the positioning platform.

10. A method of drilling coordination holes, comprising:
    probing a part to be drilled with a laser tracker;
    determining the part reference frame relative to the laser tracker based upon said probing of a part;
    affixing a laser-guided coordination hole drilling apparatus including a positioning platform to the part to be drilled proximate a hole location;
    probing a laser target on the laser-guided coordination hole drilling apparatus with the laser tracker;
    determining a tool reference frame of the laser-guided coordination hole drilling apparatus relative to the laser tracker and the part based upon said probing of a laser target;
    positioning the positioning platform relative to the part while the laser-guided coordination hole drilling apparatus remains affixed to the part such that a drilling tool affixed in a drill motor secured to the positioning platform of the laser-guided coordination hole drilling apparatus is positioned proximate the hole location based upon the part reference frame and the tool reference frame; and
    drilling a hole with the drilling tool at the hole location.

11. The method of claim 10, wherein probing a laser target and determining the tool reference frame of the laser-guided coordination hole drilling apparatus are performed automatically.

12. the method of claim 10, wherein positioning the tool affixed in the drill motor secured to the laser-guided coordination hole tool proximate the hole location is performed at least two of manually, semi-automatically, and automatically.

13. The method of claim 10, wherein positioning the drilling tool affixed in the drill motor secured to the laser-guided coordination hole drilling apparatus proximate the hole location comprises aligning a normal vector from the center of the hole location through the center of the drilling tool.

14. The method of claim 10, wherein positioning the drilling tool affixed in the drill motor secured to the laser-guided coordination hole drilling apparatus proximate the hole location comprises aligning the drilling tool such that a vector from the center of the drilling tool intersects the center of the hole location normal the surface of the part at the hole location.

15. The method of claim 10, wherein drilling a hole is performed using one of a drill bit and a milling tool.

16. The method of claim 10, further comprising removably securing the laser target in a bushing cavity defined by the positioning platform.

17. A method of drilling laser-guided coordination holes in a part of an aircraft, comprising:
    probing the part to be drilled with a laser tracker;
    determining the aircraft part reference frame relative to the laser tracker based upon said probing of a part;
    affixing a laser-guided coordination hole drilling apparatus including a positioning platform to the part to be drilled proximate a hole location;
    probing a laser target on the laser-guided coordination hole drilling apparatus with the laser tracker;
    determining a tool reference frame of the laser-guided coordination hole drilling apparatus relative to the laser tracker and the part based upon said probing of a laser target;
    positioning the positioning platform relative to the part while the laser-guided coordination hole drilling apparatus remains affixed to the part such that a drill bushing rotatably secured in the positioning platform of the laser-guided coordination hole tool drilling apparatus is positioned proximate the hole location based upon the aircraft part reference frame and the tool reference frame;
    drilling a hole in the part with a drilling tool extending through the drill bushing; and
    loosening the laser-guided coordination hole drilling apparatus from the part.

18. The method of claim 17, wherein affixing the laser-guided coordination hole tool to the part comprises manually tightening screw clamps to the part.

19. The method of claim 17, wherein affixing the laser-guided coordination hole drilling apparatus to the part comprises applying vacuum cups to a surface of the part.

20. The method of claim 17, wherein positioning the drill bushing proximate the hole location based upon the aircraft part reference frame and the tool reference frame comprises manually adjusting fine screw adjustments.

21. The method of claim 17, further comprising monitoring the position of the drill bushing of the laser-guided coordination hole drilling apparatus during the drilling by the laser tracker probing the laser target to detect any movement in the tool reference frame.

22. The method of claim 21, further comprising discontinuing the drilling when movement is detected in the tool reference frame.

23. The method of claim 17, further comprising indicating the hole location by the laser tracker pointing a laser at the hole location on the part.

24. The method of claim 17, further comprising removably securing the laser target in a bushing cavity defined by the positioning platform.

* * * * *